ISOLATING CIRCUIT BREAKER

Original Filed Nov. 14, 1968 8 Sheets-Sheet 1

Inventor:
Donald E. Weston
By Gary, Parker,
Juettner, Pigott & Cullinan Attys

ISOLATING CIRCUIT BREAKER
Original Filed Nov. 14, 1968 8 Sheets-Sheet 2
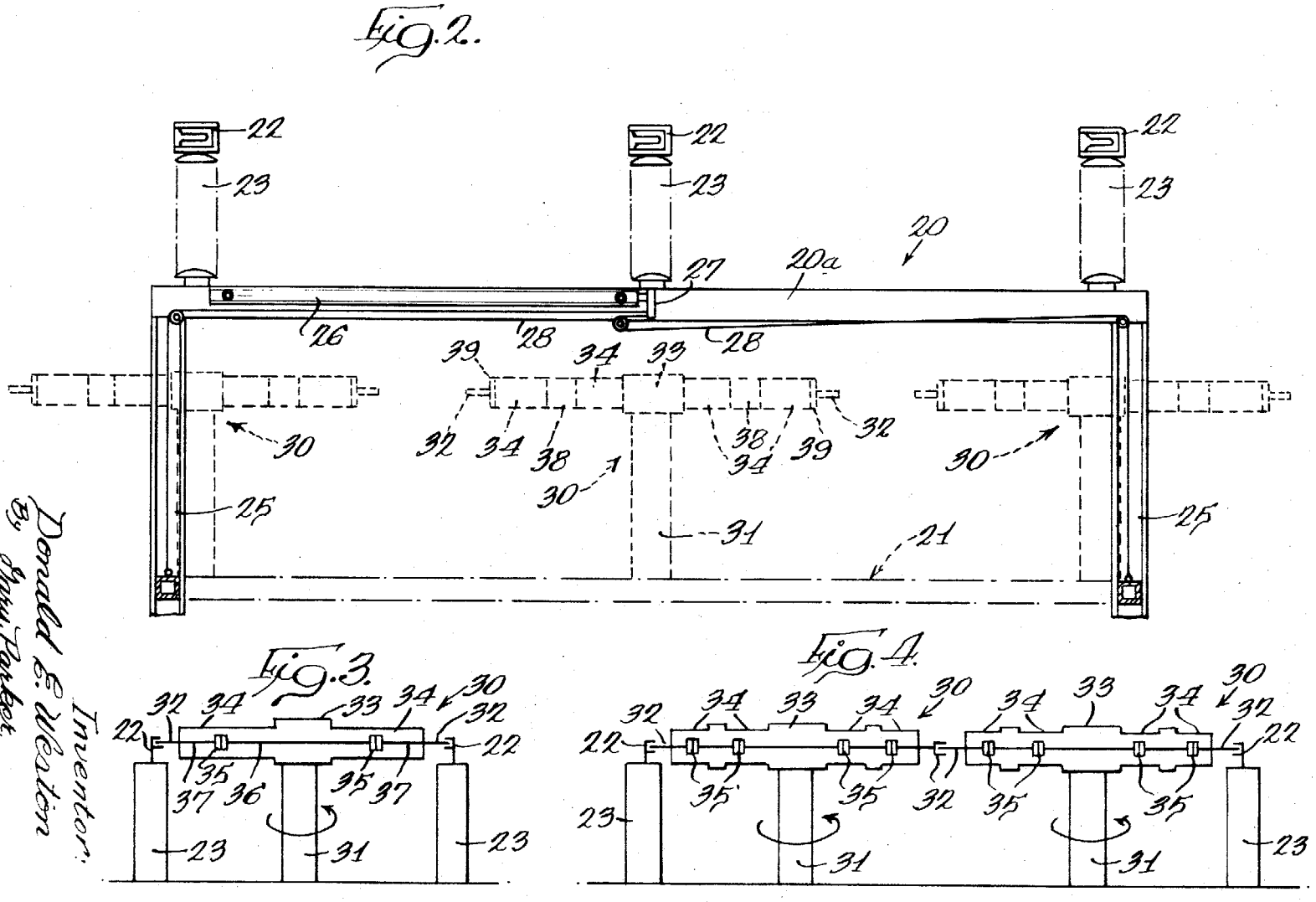
Inventor:
Donald E. Weston
By Gary, Parker,
Juettner, Pigott & Cullinan,
Atty's

ISOLATING CIRCUIT BREAKER

Original Filed Nov. 14, 1968 3 Sheets-Sheet 3

Inventor
Donald E. Weston
By Gary, Parker
Juettner, Pigott & Cullinan
Attys

ISOLATING CIRCUIT BREAKER

Original Filed Nov. 14, 1968 8 Sheets-Sheet 4

Inventor:
Donald E. Weston
By Gary, Parker,
Juettner, Pigott & Cullinan
Attys

ISOLATING CIRCUIT BREAKER

Original Filed Nov. 14, 1968 8 Sheets-Sheet 5

Inventor:
Donald E. Weston
By Gary, Parker,
Juettner, Pigott & Cullinan
Attys

ISOLATING CIRCUIT BREAKER

Original Filed Nov. 14, 1968 8 Sheets-Sheet 6

Inventor:
Donald E. Weston
By Gary, Parker,
Juettner, Pigott & Cullinan
Attys

ISOLATING CIRCUIT BREAKER

Original Filed Nov. 14, 1968 8 Sheets-Sheet 7

Inventor:
Donald E. Weston
By Gary, Parker,
Juettner, Pigott & Cullinan
Attys

ISOLATING CIRCUIT BREAKER

Original Filed Nov. 14, 1968 8 Sheets-Sheet 8

Inventor:
Donald E. Weston
By Gary, Parker,
Juettner, Pigott & Cullinan
Attys

United States Patent Office

Re. 27,625
Reissued Apr. 17, 1973

27,625
ISOLATING CIRCUIT BREAKER

Donald E. Weston, East Sebago, Maine, assignor to H. K. Porter Company, Inc.

Original No. 3,566,055, dated Feb. 23, 1971, Ser. No. 775,660, Nov. 14, 1968. Application for reissue Oct. 29, 1971, Ser. No. 193,836
Int. Cl. H01h *31/00*
U.S. Cl. 200—48 SB 30 Claims

Matter enclosed in heavy brackets [ ] appears in the original patent but forms no part of this reissue specification; matter printed in italics indicates the additions made by reissue.

ABSTRACT OF THE DISCLOSURE

High tension electric circuit breaker comprising the combination of interrupter switch means and disconnect switch means so combined as to perform the functions of a high capacity circuit breaker, and also to perform the usual functions of a disconnecting switch, whereby to provide a single switch of novel structure attaining all of the functions of prior art circuit breakers, interrupters and disconnect switches.

BACKGROUND OF THE INVENTION

High tension electrical switchgear has conventionally consisted of (a) circuit breakers, (b) disconnect switches and (c) interrupters.

Circuit breakers are high capacity load-carrying devices capable of transmitting high load currents at high voltages. Their primary function is to stop the high flow of current when a circuit is to be opened. They are [also] *specifically* capable of stopping the flow of current for *any and* all *circuit conditions, i.e.,* load, [and] no-load *and fault* conditions [of the circuit] when*ever* the circuit is to be opened, *and also for closing the circuit under all circuit conditions.*

Disconnect switches are also high capacity load-carrying devices, but they have no capability for stopping the flow of current. Their primary function when closed is to connect various circuit components together, and when opened to disconnect said components and insert a sufficiently large gap in the circuit to prevent inadvertent reclosure of the circuit.

In a high voltage, high amperage circuit, it is necessary to employ both circuit breakers and disconnect switches, the former to open the circuit against [large] current flow and the latter to open the circuit against [all flow] *inadvertent reclosure,* i.e., to electrically *and physically* [isolate] *separate* the circuit components.

An interrupter *switch* generally is not a load-carrying device, but a specialized instrument inserted momentarily in a circuit for the purpose of stopping flow of relatively nominal currents.

[In those circuits having nominal current flow, it] *It* is conventional in *electric circuits* to combine an interrupter switch and a disconnect switch in such fashion that the interrupter is normally out of circuit and the disconnect switch carries all the current. Upon opening, however, the interrupter is momentarily placed in series circuit with the disconnect until the disconnect has moved sufficiently to prevent arc-over, whereupon the interrupter opens to [break] *interrupt* the current flow and the disconnect continues to full open position.

*There are also interrupters that carry load current and operate to stop the flow of load current in a circuit, but they remain essentially a specialty instrument, for specific limited service and are neither adapted for nor intended to act as a circuit breaker or to perform the broad spectrum functions of a breaker in a circuit. Combination disconnect and load-carrying interrupter switches of this general character are sometimes called "circuit switchers," which term is not to be confused with "circuit breaker."*

Manifestly, there are those circuits which require all three of the described switch structures, *i.e., circuit breakers, interrupters, and disconnects,* to effectively open and/or close the circuit.

*In regard to combination disconnects and interrupters, reference is made particularly to Gussow et al. 3,154,656 and Lindell 3,268,696, and also to Schwager 2,838,637.*

*As part of the background, special reference is made to British Patent 1,028,719 which discloses a combination disconnect and interrupter switch wherein a plurality of vacuum tube interrupters are mounted within an insulated housing and connected in series with one another and contacts at the ends of the housing, the housing being mounted to constitute a double-break disconnect switch and being movable subsequently to opening of the interrupters to completely isolate the interrupters from the circuit. This switch has marked similarity in appearance, but not in operational performance, to the preferred embodiment of the apparatus of this invention. See also U.S. Patent 2,710,322.*

DEFINITION OF TERMS

*The electrical industry apparently does not use the terms above discussed in a specialized "word of art" sense which is here intended, but rather, frequently in interchangeable and/or overlapping senses. For example, circuit breakers include "interrupting contacts" which "interrupt" the circuit; interrupters are sometimes said to "break" or "open" a circuit; and disconnect switches are said to "open" a circuit and to "isolate" a circuit component even though the only function performed is insertion of a single air gap in the circuit.*

*Lacking other specific terms well known in the electrical art, the above and below-defined terms will be used herein in accord with the specialized or specific definitions given:*

*The terms "break," "breaking" and "circuit breaking operations" refer to the functions performed in a circuit by a circuit breaker, as the latter device has been above described.*

*"Interrupt," "interrupting" and "interrupter" refer to the device conventionally known as an interrupter switch as above described, and to the specialized or limited functions heretofore performed thereby in a circuit (especially as contrasted to the broad spectrum functions of a circuit breaker).*

*"Disconnect" and "disconnecting" refer to the device conventionally known as a disconnect switch and to the functions it performs in a circuit, as above described.*

*"Isolate," as used in connection with the apparatus of the invention, is intended to mean total isolation of certain components of the apparatus from the circuit, i.e., insertion of large air gaps to both sides of said components so that they have no connection whatever with any part of the circuit.*

SUMMARY OF THE INVENTION

The object of the present invention is to provide an improved economical switch structure embodying all of the functions of the prior switches into a single unitary device.

I call this device an "Isolating Circuit Breaker," as it performs the functions of both breaking the circuit and isolating the circuit breaker means from the remainder of the circuit, thereby disconnecting the circuit. The device inherently embodies and performs the ultimate functions of an interrupter, or considered alternatively, does away with the need for an interrupter.

Moreover, it is an object of the invention to constiute the isolating circuit breaker in such manner that vhat previously were simply low capacity "interrupting" levices now become adapted to performance of high :apacity "circuit breaking" functions.

Specifically, it is the object of the invention to embody n one structure the combination of disconnect switch neans and interrupter switch means in such manner that he structure performs the functions of both a circuit ›reaker and circuit disconnecting means.

Another object is to embody the "isolating circuit ›reaker" in such structural form as to facilitate its physi:al removal from the environment of the circuit in the ›pen position thereby to provide for safe servicing of he operating components thereof.

Additional objects and advantages will become mani'est as the description proceeds.

THE DRAWINGS

FIG. 2 is a cross sectional view taken substantially on ine 2—2 of FIG. 1;

FIG. 3 is a schematic representation of a two module solating circuit breaker;

FIG. 4 is a schematic representation of a double-type solating circuit breaker comprised of two four-module nits;

DESCRIPTION

In order to acquaint those skilled in the art with the nanner of making and using my invention, I have shown ınd will now describe what I presently contemplate to ›e the best mode of carrying out my invention.

Figure 1:
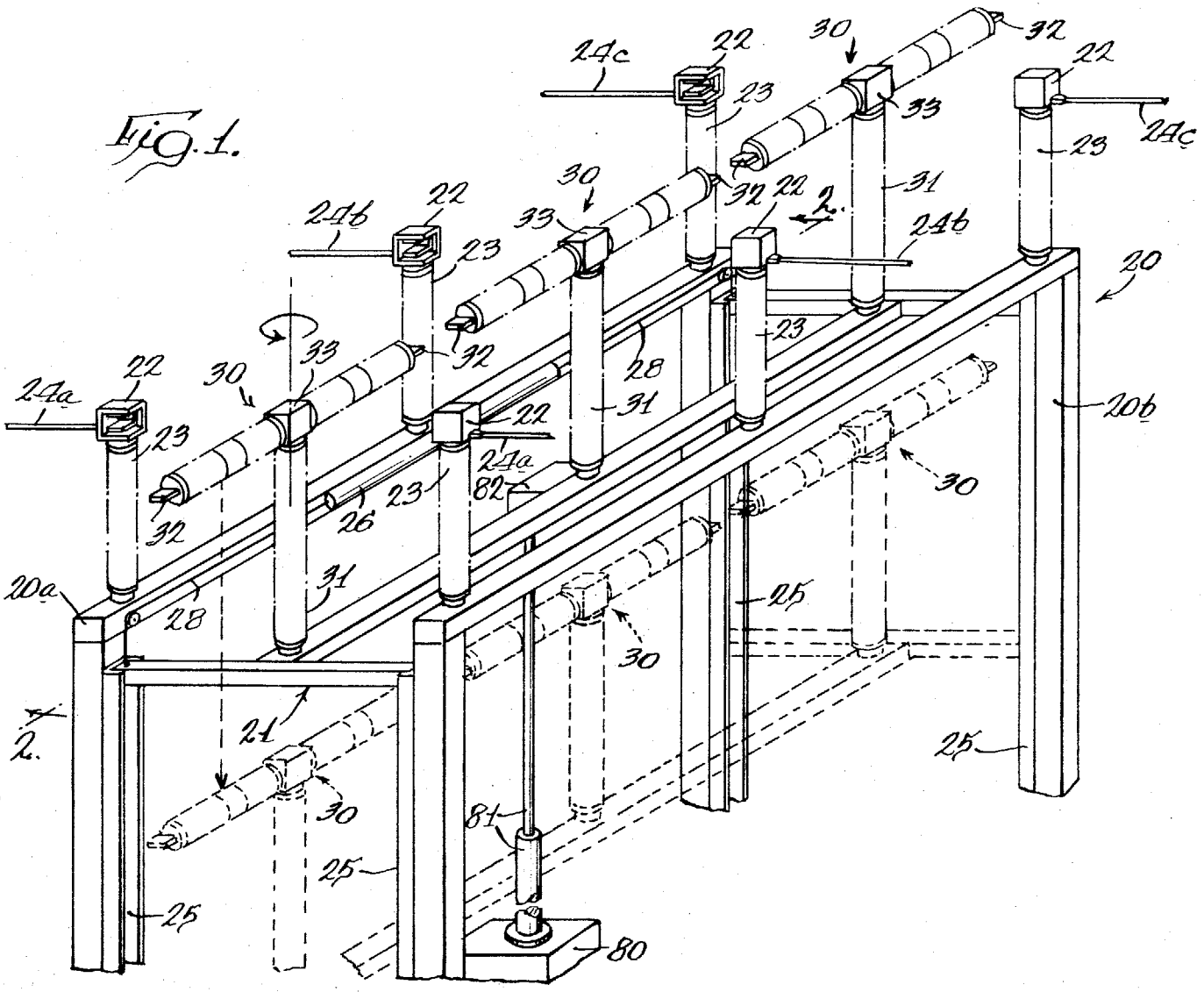
FIG. 1 is a perspective view of a three phase high ten-ion isolating circuit breaker provided in accordance with he present invention.

In its preferred embodiment, the complete switch tructure comprises a stationary frame 20 including ›aced parallel frame parts 20a and 20b, and a movable 'rame 21 mounted on and guided by the stationary frame. The stationary frame parts 20a and 20b mount respec-ive ones of one or more pairs of stationary disconnect :ontacts 22, each of which is mounted on an insulator ;tack 23 and adapted to be connected with the respective ›art of a transmission line 24. In FIGS. 1 and 2, I have :hown a switch structure for a three phase high voltage—ıigh current power transmission system comprising three ines 24a, 24b, 24c, and have thus provided and shown hree pairs of said stationary contacts 22 and their sup-›orting insulators 23; adjacent contacts being spaced ransversely from one another and vertically above the 'rame at the phase spacings required for the system.

The movable frame 21 is in the form essentially of ın H and has the opposite ends of its two end legs slidably guided in vertical channels 25 secured to the stationary frame, whereby the H frame 21 may be raised and lowered relative to the stationary frame. The means for raising and lowering the frame 21 may take any of a variety of forms, for example, a pair of hydraulic or pneumatic cylinders 26 secured respectively to the frame parts 20a and 20b and each equipped with a movable piston 27 connected to a pair of cables 28 which in turn are connected to the H frame so as to raise and accommodate gravity lowering of the frame as the pistons are moved in opposite directions in the cylinders. Preferably, the pistons are synchronized for conjoint operation to maintain the frame 21 level.

Mounted on the cross beam of the H frame 21 are one or more T-shaped movable switch components 30, each of which is mated to a respective pair of the stationary contacts 22. In a three phase system, there are three components 30 as shown. The vertical leg of the T of each component comprises essentially a mounting insulator, somewhat comparable to the insulators 23, and the horizontal leg thereof comprises a combination circuit breaker and double break disconnect switch as will presently be described.

In the structure shown, each of the components 30 is mounted on the frame 21 for rotary movement through an arc, preferably not less than 60° and not more than 120°, so that the horizontal leg thereof can be rotated counterclockwise to a switch open position as shown in FIG. 1, wherein the leg is disposed transversely of the respective transmission line 24 and in spaced relation to both of the respective stationary contacts 22, and can be rotated clockwise to a switch closed position wherein the horizontal leg of the T extends between the respective pair of stationary contacts and makes electrical contact therewith. For the latter purpose, each end of the horizontal leg is equipped with a flat blade contact 32 and each of the stationary contacts 22 is generally C-shaped to receive the blade as it is rotated theretoward. The C-shape of the stationary contacts affords the advantages of shielding the blade contacts and mitigating such formatiion of ice on the contacts as would impair switch operation in outdoor installations in cold climates.

Essentially, as is illustrated schematically in FIG. 3, the horizontal leg of each switch component 30 comprises a central section 33 coupled to the vertical leg 31 of the T and containing circuit breaker operating means, a pair of insulated housings 34 extending to opposite sides of said central section, circuit breaking means 35 in each of said housings, means 36 electrically connecting the adjacent ends of the circuit breaking means together, and means 27 connecting the remote ends of the circuit breaking means to the respective ones of said blade-like contacts 32. Thus, in switch closed position (as shown in FIG. 3) the circuit is made through two pairs of disconnect contacts 22–32 and two of the circuit breaking means 35, all connected in series. In switch open position (as will be described) there are four gaps in the circuit, i.e., at each of the circuit breaking means 35 and at each of the two pairs of disconnect contacts 22–32; the latter two gaps (as shown in FIG. 1) constituting disconnect switch gaps and totally isolating the circuit breaking means from the remainder of the circuit.

In a second embodiment, each half of the horizontal leg of the T component 30 is comprised of two of the insulated housings 34, each containing a circuit breaking means 35 (see FIG. 4 as exemplary) whereby the circuit is made through four circuit breaking means and the two pairs of disconnect contacts, all in series circuit.

For extremely high voltage systems, T components 30 may be compounded in each phase, as illustrated in FIG. 4, to facilitate attainment of high voltage circuit breaking capabilities by series circuit application of a plurality of relatively low voltage interrupting devices. Specifically, two or more T components 30 may be mounted at appropriate spacings to make contact with one another and to separate from one another upon rotation in the same directions. Thus, with a single component as shown in FIG. 3 or with two components as shown in FIG. 4, 2, 4, 6 or 8 circuit breaking means 35 may be provided in series circuit.

For purposes of particular description herein, I have selected that embodiment wherein the switch structure comprises a single T component 30 provided with a horizontal leg housing four circuit breaking means, as will now be described in conjunction with FIGS. 5 to 11.

As briefly set forth above, the horizontal leg of the T component comprises a central section 33 connected rigidly to the upright insulator 31, and a pair of leg portions each of which comprises a pair of hollow insulators 34, an intermediate housing segment 38 and an end cap 39 mounting the respective disconnect contact 32.

Each hollow insulator 34 houses therein an interrupting device 40 and a bypass or shunt switch device 44, which together comprise the circuit breaking means 35 above referred to. The interrupting devices 40 are preferably vacuum tube interrupters conventionally available on the market and well known to those skilled in the art. Consequently, they will not be described in detail herein except to note that each comprises a tube of insulating material evacuated to a finite degree and containing a pair of separable contacts, one of which is movable and adapted to be actuated by means of a rod 41 projecting from one end of the tube. Adjacent ones of the interrupters 40 are mounted with their actuator rods 41 juxtaposed and conductive means is provided between the rods to electrically connect the movable contacts. The other contact of the outboard one of the interrupters is connected by means 37, such as a braid conductor or the like, to the adjacent disconnect contact 32; and the other contact of the inboard interrupter is similarly connected by a braid or like means 36 to its counterpart in the other half of the horizontal leg of the T. The interrupters are thus mounted back-to-back to minimize problems consequent upon polarity sensitivity and/or electrical nonsymmetry of the vacuum tube devices.

The bypass or shunt switches 44 each comprise a load-carrying conductive rod or bar 45 and a plural finger movable contact 46 engageable with and disengageable from the bar. As with the interrupters, the movable contacts of adjacent shunt switches are disposed adjacent one another and electrically connected. The outboard shunt bar 45 is connected by braid or like means 37a to the disconnect contact 32, and the inboard bar 45 is connected by a braid or like means 36a to its counterpart on the other side of the center section 33.

For purposes of actuating the switches 40 and 44 in predetermined sequence, the intermediate housing segment 38 mounts an operating mechanism 50, such as a cam, toggle link or like mechanism, adapted to be driven from an insulated rotary shaft 51 that extends upwardly through the upright insulator 31 into the center section 33. Within the section 33, the shaft 51 carries a pair of crank arms 52 which are connected respectively to a pair of operating links 53 that extend in opposite directions from the center section to the respective mechanism 50.

Figure 6:
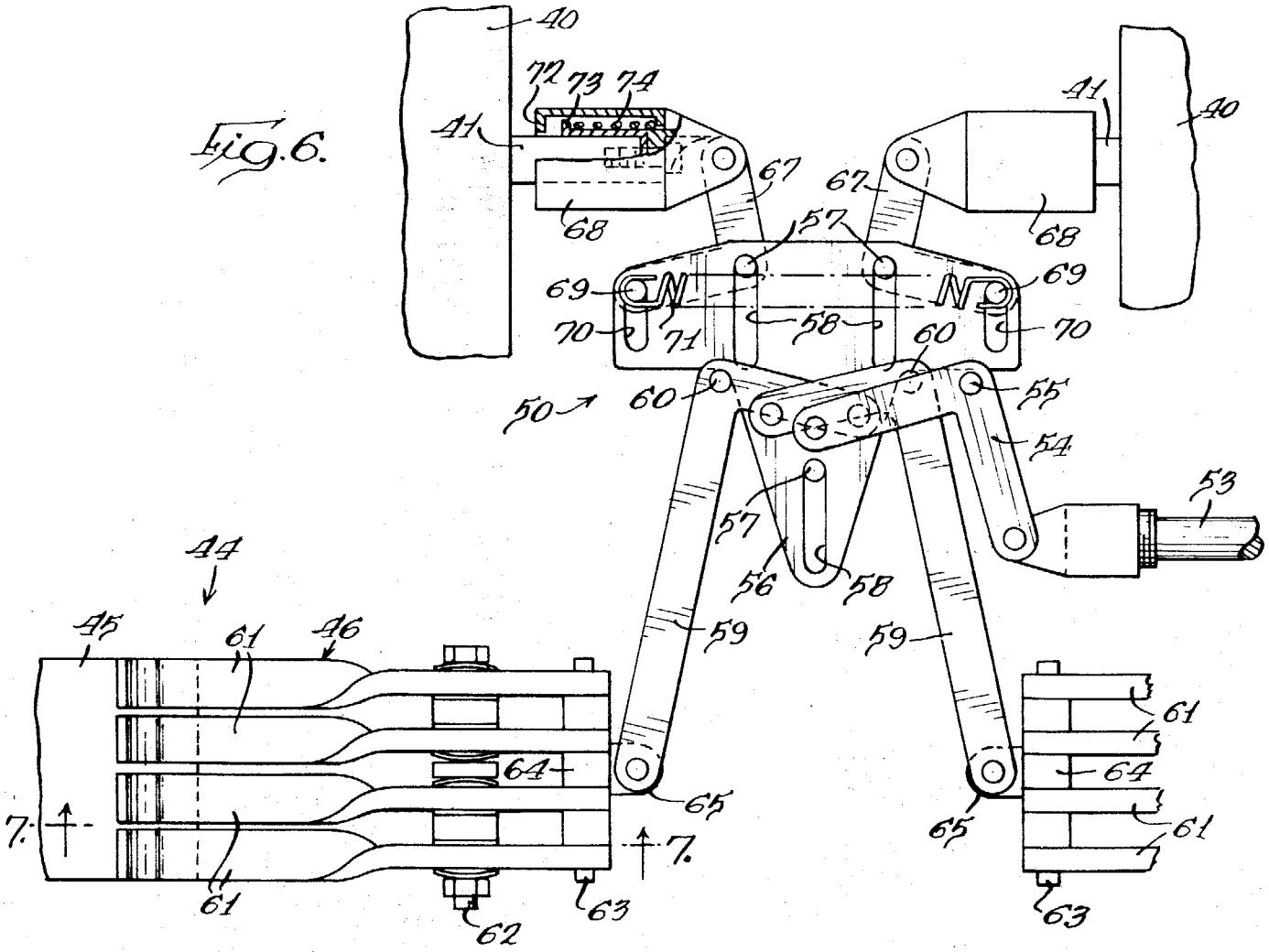
FIG. 6 is an enlarged elevational view of the circuit ›reaker operating means of the apparatus shown in FIG. 5.

As shown in FIG. 6, each mechanism 50 of the illustrated embodiment of the switch comprises a toggle-link apparatus including a bellcrank lever 54 pivotally mounted on a pin 55 secured to the housing segment 38 and pivotally connected at its opposite ends to the link 53 and a vertically reciprocable operator 56 to drive the latter upon movement of the link 53. The operator is guided for vertical movement by three pins or studs 57 which are secured to the housing segment 38 and extend through vertical slots 58 in said operator plate.

Pivotally connected to the operator are the inner ends of a pair of bellcrank levers 59 which extend downwardly from the operator to respective ones of the movable shunt contacts 46, the levers each being pivotally mounted on a pin 60 secured to the housing segment 38.

Figure 7:
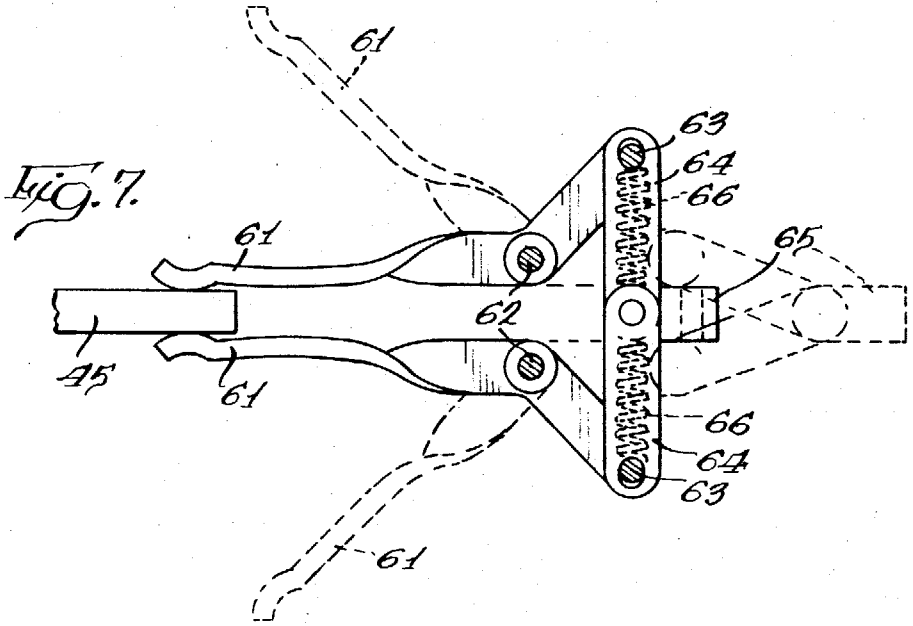
FIG. 7 is a detail view taken substantially on line '—7 of FIG. 6.

As shown in FIGS. 6 and 7, each contact 46 comprises two sets of spaced parallel contact fingers 61 disposed to opposite sides of the respective load-carrying bar 45, each finger being in the form of a bellcrank and the fingers of each set being pivotally mounted on a common pivot bolt 62 which is mounted on the segment 38. At their ends opposite the bar, the fingers of each set receive a pin 63 to which a respective one of a pair of toggle links 64 is pivotally connected. The two toggle links in turn are pivotally connected to one another and an operating stud 65 positioned on the center line of the shunt switch, each such stud 65 being pivotally connected to the lower end of the respective one of the cranks 59.

Figure 5:
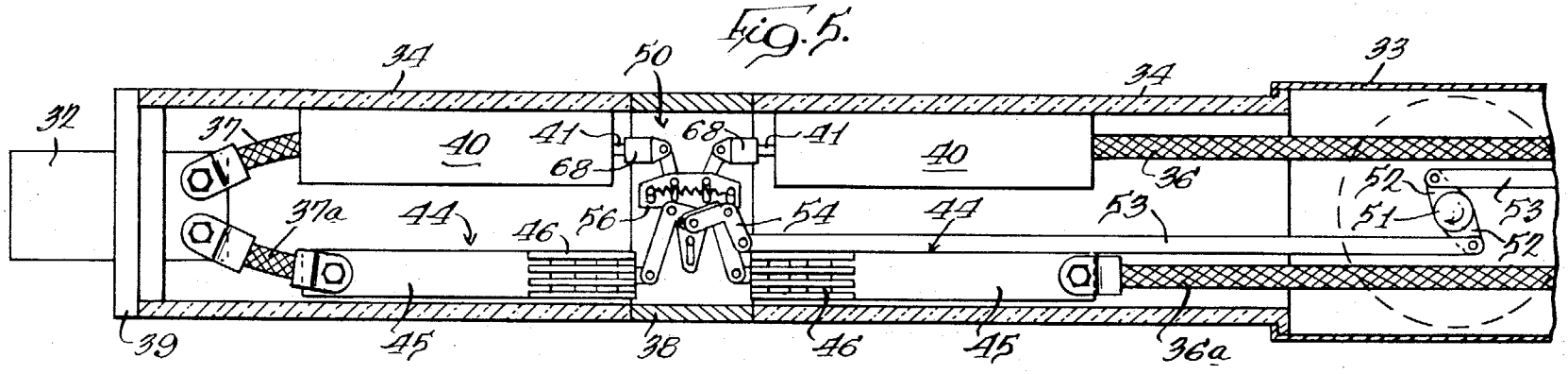
FIG. 5 is a horizontal longitudinal section of one-half ›f the movable blade portion of a four-module isolating :ircuit breaker.

By virtue of the described structure, as the shaft 51 is rotated in the clockwise direction as viewed in FIG. 5, the link 53 is moved toward the outer end of the leg of the switch, the bellcrank 54 is swung clockwise, the operator 56 is raised upwardly, the levers 59 are moved toward one another, the toggle links 64 are collapsed toward one another, and the sets of contact fingers are moved away from one another and the bar 45 to shunt switch open position as shown in dotted lines in FIG. 7.

Upon reverse operation, the sets of contact fingers are, of course, closed upon the bar 45 in obvious manner. However, upon closing movement, it is desirable to establish a wiping engagement between the fingers and the bar to insure good contact, and I provide for this by so proportioning the toggle links 64 that as they move through their on-center position they physically flex the contact fingers and thereby cause the same to have momentary high pressure sliding engagement with the bar 45. Then, I move the toggle slightly overcenter to permit springs 66 or the like (disposed between the stud 65 and each of the pins 63) to maintain a predetermined compressive force on the contacts. Also, movement of the toggle overcenter serves to lock the contacts against inadvertent opening in the event of surge currents or other forces emanating from electrical phenomena to which the switch is exposed. To accommodate the described functions, each link 64 has a slight lost motion connection with its respective pin 63.

To insure good current transfer, the contact fingers 61 are assembled on the pivot bolts 62 with interposed silver washers and Bellville spring washers, as illustrated in FIG. 6, whereby to constitute the bolts 62 and the housing segment 38 a conductive link between the shunt switch contacts.

Adjacent the upper end of the operator plate 56, a pair of toggle links 67, in the form suitably of bellcranks, are pivotally mounted on the plate guiding studs or pins 57. At their upper ends, these links are pivotally connected to operating studs 68 for the interrupters 40 and constitute a conductive link between the interrupter contacts. At their lower ends, they carry pins 69 which are received in vertical slots 70 in the operator 56, the two pins being interconnected by a tension spring 71. The slots 70, which are shorter than the operator guide slots 58, are so proportioned that the pins 69 are not engaged by the operator in the switch opening direction until after sufficient movement has occurred to result in substantially complete opening of the shunt switch contacts 46 in the manner above-described.

As known to those skilled in the art, the vacuum tube interrupters 40 have an extremely short stroke of contact movement, whereby the toggle links 67 require only a slight movement. To obtain the required stroke, I mount the toggle links to have equal but small arcs of movement to the opposite sides of the on-center position thereof. Consequently, as the shunt contacts approach their full open positions, the plate 56 engages the pins 69 and moves them upwardly to slightly beyond their on-center position, whereupon the spring 71 drives the links rapidly to their opposite or upper overcenter position (such movement being accommodated by the slots 70 which by now are positioned primarily upwardly above the pins 69).

During the initial upward movement of the pins 69 to substantially their on-center position, the links 67 are operated to move the interrupter operating studs 68 a short distance toward one another. To accommodate this movement without disturbing the interrupter contacts, each stud 68 has a lost motion connection with the operating rod 41 of the respective interrupter. Specifically, each stud 68 comprises a tube slidably mounted on the respective rod and having an inwardly directed flange 72 at its end that is opposed to and has lost motion relative to an outwardly directed flange 73 on the rod 41, whereby the initial movement of the links 67 results solely in bringing the flange 72 adjacent or into bare engagement with the flange 73 without moving the rod 41. Then, when the spring 71 starts to drive the links 67, the flange 72 engages the flange 73 whereby the spring 71 drives the interrupters to open position at high speed. For purposes of maintaining pressure on the interrupter contacts in closed position and facilitating closing operation of the interrupters, a compression spring 74 is preferably disposed between the stud 68 and the rod flange 73.

Thus, as the shaft 51 is rotated in switch opening direction, the shunt contacts 46 are forced open fully, and thereafter the interrupters are operated to open position at high speed.

Upon reverse rotation of the shaft 51 from switch open position, the link or rod 53 pulls the bellcrank lever 54 back toward the position shown in FIG. 6. As this occurs, the slots 70 (which now extend upwardly above the pins 69) prevent actuation of the pins 69 and links 67 until the shunt switch contacts 46 are fully closed, and thereafter the links 67 are actuated to result in high speed reclosing movement of the interrupters 40.

For purposes of driving the switch to effect operation of the interrupters and the shunt switches, and also to effect opening and closing movement of the disconnect switch means provided by the contact pairs 22–32, the mechanism shown in either FIGS. 8 to 10 or FIG. 11 is provided for rotating both the shaft 51 and the insulator 31 in timed relationship. In a three phase assembly of three of the switches, as is shown in FIGS. 1 and 2, operating mechanisms may be provided for all three switches, all driven off a common prime mover shaft. Alternatively, only one operating mechanism need be provided, the same being connected for example to the central one of the three switches and the other two or outboard switches being operated by slave connections to the center switch.

Figure 10:
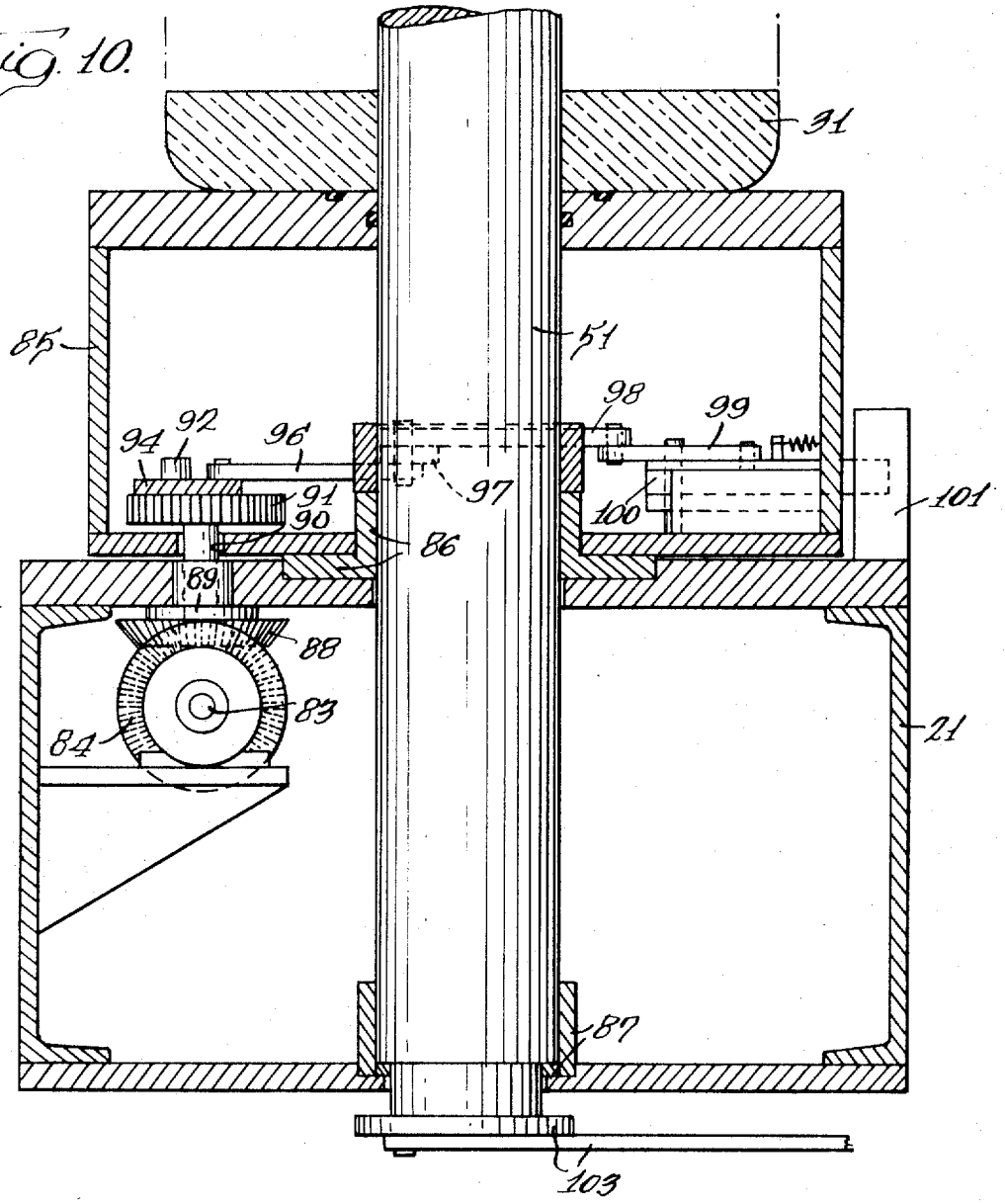
FIG. 10 is a vertical section taken substantially on line 10—10 of FIG. 8.

Operation may be effected manually from the ground, or by means of a power operator such as an electric or hydraulic motor which may be mounted either on the ground or on the movable frame 21 of the three phase switch assembly. In FIG. 1, I have shown a power operator 80 mounted at substantially ground level and connected to the center one of the switches 30 by a telescopic rotary drive shaft 81 operating through a gear box 82. Referring to FIG. 10, the gear box includes a horizontally disposed rotary drive shaft 83 which extends adjacent the insulator 31 of the center switch and is there provided with an input bevel gear 84.

The insulator 31 is tubular and the insulated shaft 51 extends axially therethrough, whereby to provide a pair of coaxial control devices while maintaining an insulating gap between the live switch components and the grounded supporting steel. The insulator 31 is mounted on a box-like support 85 and this support is journalled by bearings 86 on the main or cross beam of the movable H frame 21. The shaft 51 extends downwardly through the box support 85 and the frame 21 and is rotatably supported adjacent its lower end by bearings 87 on the frame 21. The box 85 provides a housing for switch operating mechanism, and the downward extension of the shaft 51 facilitates provision of slave connections to the other two switches, as will presently appear.

The input bevel gear 84 is meshed with a complementary gear 88 for rotating a vertically disposed shaft 89 which is journalled in the frame 21 and extends upwardly through an arcuate slot 90 in the base wall of the box 85, the slot being of sufficient arcuate extent to accommodate predetermined rotation of the insulator 31, for example, 90 degrees rotation. Within the box, the shaft 89 carries an interrupted spur gear 91 having an eccentric pin 92 projecting from its upper surface. The gear teeth on the member 91 are intended to mesh with a ring gear segment 93 on the inner surface of the box 85, but at the beginning of the cycle said gear teeth are interrupted so that initially only the member 91 will rotate.

Figure 8:
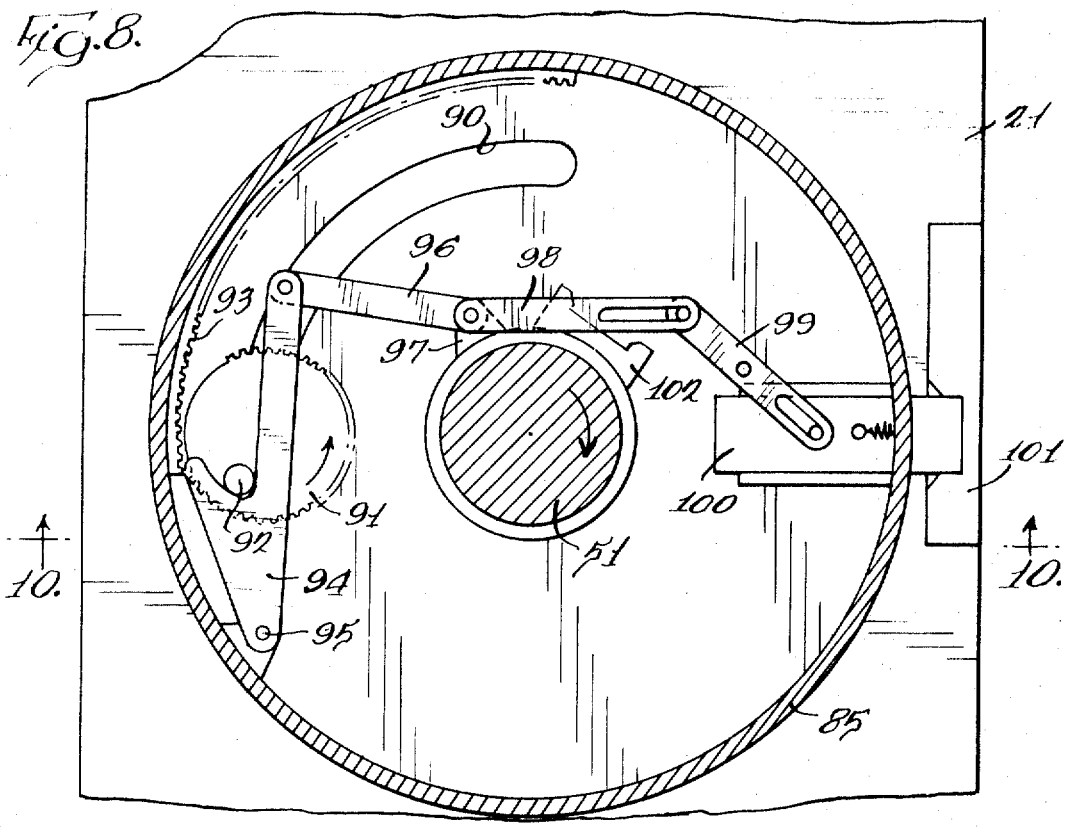
FIG. 8 is a plan view of the operating mechanism for he isolating circuit breaker, showing the same in switch :losed position.

As the member 91 is rotated in a counterclockwise direction as shown in FIG. 8, the pin 92 will first engage the mid-portion of the right leg of a Y-shaped lever 94 pivoted at 95 in the box 85 and move the same toward the center of the box. A link 96 interconnects the free end of the lever 94 and a crank 97 affixed to the shaft 51, whereby the shaft 51 is rotated in a clockwise direction to operate the shunt contacts 46 and the vacuum tube contact rods 41 in the manner above-described. This function occurs in an extremely short period of time inasmuch as the gear 91 is required to rotate only about 30 degrees total and its movement is amplified by the link 94 to drive the shaft 51 to the extent required to operate the shunt and vacuum switches.

While the shaft 51 is being rotated, a second link 98 coupled to the crank 97 consumes a predetermined lost motion relative to a lever 99 so that as the shaft 51 approaches the limit of its clockwise movement said lever is actuated quite rapidly to drive a lock bolt 100 out of locking engagement with a stop 101 on the frame 21 and into locking engagement with a keeper 102 mounted on the shaft 51 (which at this time has rotated into alignment with the bolt).

The bolt 100 when engaged with the stop 101 serves to lock the disconnect switch in closed circuit position as protection against surge currents and the like. It also insures that only the shaft 51 rotates during initial opening operation of the gear 91, i.e., during the heavy load part of the cycle of operation of the toggle mechanisms 50. Then, the lock bolt is freed from the frame to accommodate the next sequence in the operation—opening of the disconnects—and substantially simultaneously locks the shaft 51 to the insulator 31 for conjoint rotation with the latter so as to maintain the status quo (open circuit condition) of the circuit breaking means.

Figure 9:
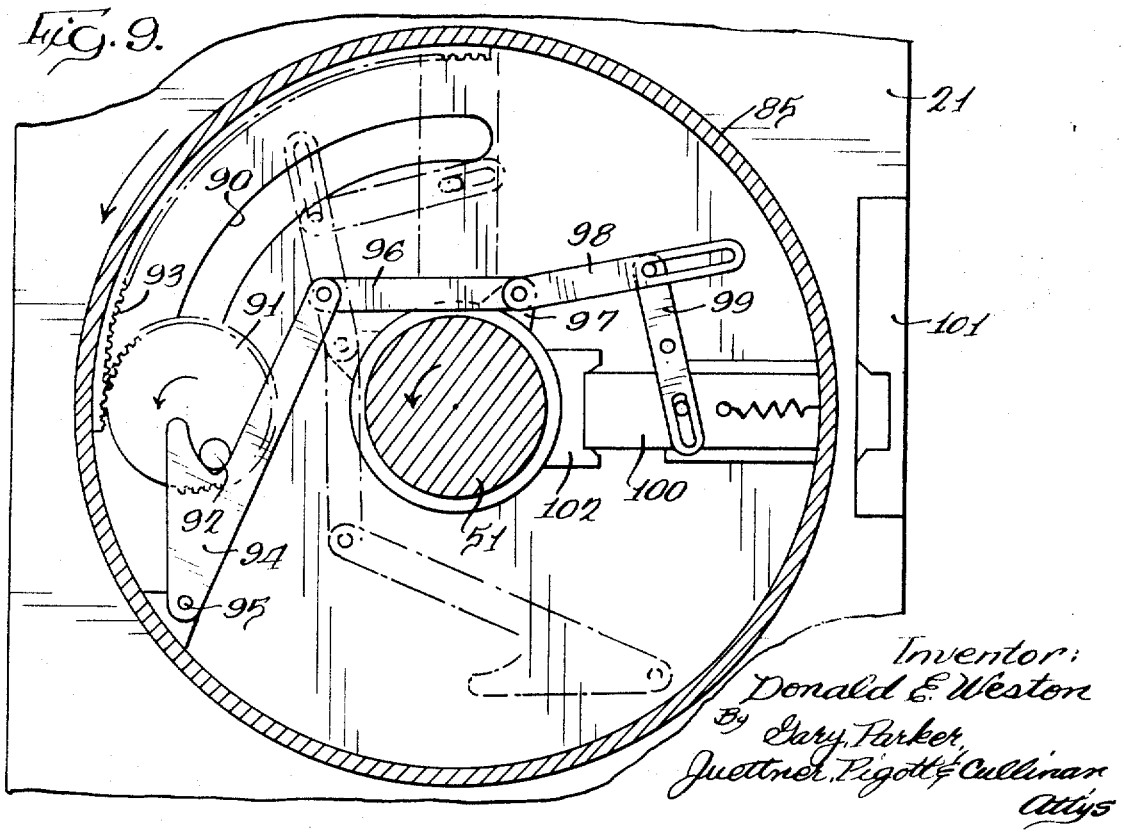
FIG. 9 is a view similar to FIG. 8 but showing the ›perating mechanism in an intermediate switch open-ng position in solid lines and in full open position in lotted lines.

As the bolt 100 engages in the keeper 102, the teeth on the interrupted gear 91 engage with the teeth on the gear segment 93 and initiate rotation of the stack 31 (together with the shaft 51) in the counterclockwise direction, thereby to swing the movable disconnect contacts 32 out of engagement and away from the stationary disconnect contacts 22, whereupon the operating mechanism assumes the position shown in dotted lines in FIG. 9. Preferably, the T component 30 is rotated 90 degrees as shown in FIGS. 1 and 2 so as to dispose the horizontal leg thereof perpendicular to the plane of the respective transmission line 24 and open up a pair of large air gaps in the line. Due to the [double break] *two air gaps or so-called "double break" disconnection* thereby achieved, the vacuum tube interrupters 40 are totally isolated from the circuit.

In a three phase installation, as previously noted, each of the three switches may embody the operating mechanism of FIGS. 8 to 10, each being driven by a gear 84 from a common drive shaft, and this generally would be preferred. However, slave drives can be utilized, the same extending from the center switch to the outboard switches and comprising crank arms and links 103 connected to the extended lower ends of the shafts 51. In this case, the slave units would not require all of the mechanism of FIGS. 8 to 10, but each would require only the link 98, lever 99, lock bolt 100 and keepers 101 and 102.

The ultimate open position of the switch (switches), may be determined by predetermined operation of the drive mechanism, disengagement of the teeth on member 91 from the teeth on gear segment 93, engagement of the margin of the slot 90 with the shaft 89, or a position stop on the frame 21 associated with a suitable part of the stack 31, box 85 or shaft 51.

To close the switch, the drive means is operated in the reverse direction to rotate the gear 91 clockwise as viewed in FIG. 9. This results, first, in rotating the gear 93 and stack 31 to close the disconnect switch contacts and to return the operating means to the position shown in solid lines in FIG. 9, whereupon the gear 91 disengages from the gear teeth 93.

At this time, the pin 92 engages the lefthand leg of the Y-shaped lever 94 and forces the left leg thereof to the left, whereupon the links 96 and 98 and lever 99 are operated to release the lock bolt 100 from the shaft 51. The bolt 100 is moved by its associated spring to release the shaft 51 from the box 85 and ultimately to lock the box to the frame mounted keeper 101. As the bolt clears the shaft keeper 102, the shaft 51 is rotated counterclockwise to operate the toggle link mechanisms 50 in the closing direction, whereby to close the shunt contacts to remake the electrical circuit, and thereafter to close the vacuum tube contacts to return the switch to its original closed circuit condition.

Figure 11:
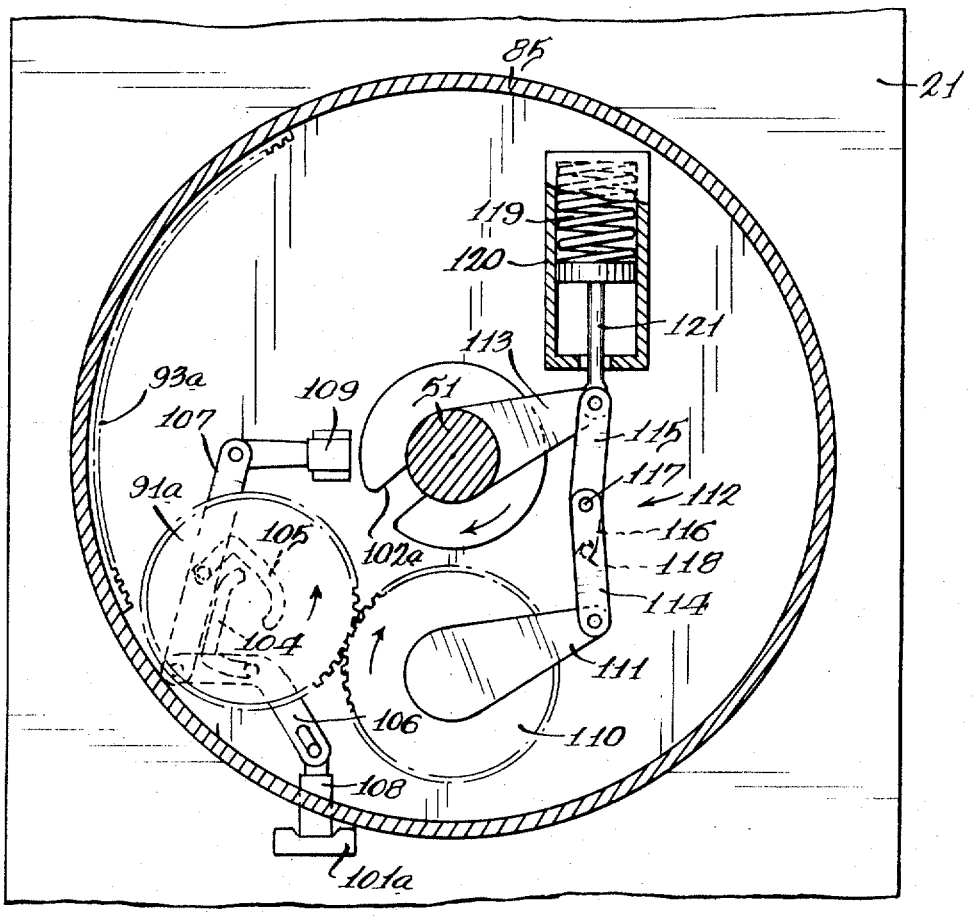
FIG. 11 is a plan view similar to FIG. 8 showing a nodified form of operating mechanism.

An alternate form of switch operating mechanism affording the advantage of very high speed opening operation of the circuit breaking means of the switch is shown in FIG. 11. In this embodiment a gear 91a similar to the gear 91 is mounted and driven in the same manner as the latter, the gear having interrupted peripheral teeth adapted to engage with the teeth on a gear segment 93a secured to the interior of the box 85. On its lower surface, the gear 91a is provided with a pair of cam tracks 104 and 105 adapted to receive follower pins mounted on respective ones of a pair of levers 106 and 107 which are connected to and operate a pair of lock bolts 108 and 109 associated respectively with a frame mounted keeper 101a and a keeper 102a associated with the shaft 51, the two bolts performing the same functions as the bolt 100 of FIGS. 8 to 10.

The peripheral teeth of the gear 91a mesh with interrupted peripheral teeth on an intermediary gear 110 which is adapted to be rotated during the initial arc of rotation of the gear 91a, i.e., before but not during rotation of the box 85 and stack 31. The gear 110, which is journalled on the bottom wall of box 85, is provided with a crank arm 111 connected to a quick trip toggle linkage 112, which in turn is connected to a crank arm 113 on the shaft 51. The linkage 112 is comprised of a pair of toggle links 114 and 115 pivotally connected respectively to the cranks 111 and 113, a trip link 116 connected to the common pivot 117 of the links 114 and 115, and a trip pin 118 fixed to the base of box 85 and projecting upwardly to the level of the trip link 116, which is the bottommost of the three links.

Also associated with the crank arm 113 on shaft 51, and thus with the linkage 112, is a circuit breaker operating spring 119, which is preferably a heavy duty compression spring housed in a casing 120 mounted on the box 85 and connected to the crank 113 by a piston and rod assembly 121.

In use, as the gear 91a is rotated in switch opening direction, the gear 110 is initially rotated to swing the crank arm 111 in a clockwise direction. As such movement occurs, the trip link 116 is engaged with the trip pin 118 and thereby requires the toggle links 114 and 115 to buckle overcenter under the pull imparted thereto by crank 111. As soon as the toggle buckles, the previously stored energy in spring 119 immediately takes over and drives the piston and rod 121 outwardly thereby collapsing the linkage 112 and rapidly driving the crank 113 and shaft 51 in the clockwise direction necessary to operation of the vacuum and shunt contacts, whereby these contacts are driven open at high speed to assure performance of the circuit breaking function.

Continued rotation of the gear 91a then results in locking the shaft 51 to the box 85 and stack 31 by operation of the bolt 109, straightening out of the linkage 112 by continued rotation of the gear 110, release of the box from the frame by operation of the bolt 108, and finally rotation of the stack to full open position.

In the latter phase of its operation, the mechanism of FIG. 11 provides for "fail-safe" operation of the circuit breaking contacts by the mechanical linkage between the cranks 111 and 113; i.e., if the spring 119 did not drive the crank 113 or did not drive it far enough, the crank 111 and linkage 112 will positively pull the crank 113 and shaft 51 into full switch open position.

Upon closing of the switch, the sequence is reversed essentially as described in connection with FIGS. 8 to 10, except that as the disconnect switch is closed the gear 110 is driven to cause the linkage 112 to operate the crank 113 to close first the shunt contacts and then the vacuum contacts, and in so doing again loads the spring 119 to prepare it for the next switch opening operation; the trip link 116 ultimately engaging over the pin 118 to lock the spring in energy stored condition.

In addition to complete operation of the switches as described in conjunction with FIGS. 8 to 11, the power or other drive means may be programmed for operation of the gear 91 or 91a through only the initial part of its movement, whereby to provide for operation of only the shunt and vacuum tube contacts for circuit breaker reclosure service. Should the quick break and reclosure fail to clear the fault, the switch could then be fully opened for detailed inspection of the system.

Should it be necessary to inspect or perform maintenance services on the shunt and vacuum tube means of the switch of the invention, the entire switch structure, i.e., the T component 30, can be lowered away from the transmission lines to facilitate inspection and maintenance services. For purposes of control of the switch lowering means, it is preferable to provide interlock means (not shown) between the switch opening means and the lowering means to accommodate operation of the latter only following complete switch opening operation of the former.

The foregoing description constitutes the mechanical assembly of components to form the [presently preferred] embodiment of my switch structure *that was preferred at the time I filed my original application for patent on this invention. Since that time, I have worked with Raymond F. Kupetis and Demetrius Karathanos on improved operating mechanisms for the Isolating Circuit Breaker, and in this connection invite attention to copending applications Ser. No. 24,079, filed Mar. 31, 1970, and Ser. No.19,511, filed Mar. 1, 1971.* However, *whatever the specific details of the physical or mechanical assembly may be,* in order to attain the ultimate objectives of my *present* invention, certain electrical characteristics must be brought into consideration.

First, one purpose of the double [break] disconnection [or] *and* total isolation of the interrupters in the open circuit position is to relieve the interrupters, and especially the vacuum gap between their contacts, of all electrical stresses when the switch is open. Similarly, the purpose of the shunt switches 44 is to relieve the interrupters of electrical stress, or at least undue electrical stress, when the switch is closed. Specifically, the shunt assembly 45, 46, 47 (*which may for this reason properly be called the main contact assembly*) is selected to carry, either alone or in combination with the interrupters, all of the load current and short time current surges of the circuit without imposing electrical stress on the interrupters. Thus, exept for the short duration of the final stage of the circuit breaking function, the interrupters are electrically unstressed and their total interrupting capacity is available for performance of the circuit breaking function.

Second, the operating mechanism is so devised and constituted that the total circuit breaking function (both opening of the shunt switches and opening of the interrupter switches) is accomplished very rapidly, e.g., in five or less cycles in the case of a 60 cycle electrical circuit, whereby further to avoid electrical stress on the interrupters except at the moment of circuit breaking. Also, the operating mechanism quickly isolates the interrupters by opening the two disconnect contact pairs in approximately one second following the break, whereby the interrupters are promptly unstressed and isolated from any return surges or the like that might tend to restrike an arc between the now open interrupter contacts. Such isolation also preserves the integrity of the vacuum gaps and the interrupter contacts, prevents contact deterioration due to current induced migration, etc.

Third, the interrupters are assembled in multiples in series circuit and are all operated simultaneously thereby (a) to adapt low rated interrupters to attainment of the function of carrying the current of the high voltage system during the time they alone are in series in the circuit and (b) simultaneously to impose on the current flow of the system a plurality of small but highly effective circuit breaking gaps whereby the voltage is divided over the several gaps to facilitate ease of circuit breaking, or in the alternative is concentrated at one or more gaps while the circuit is broken at one or more of the remainder of the gaps. Where, as here, there are four essentially identical series connected vacuum tube interrupters subject to fault conditions, a voltage dividing network is associated with the interrupters to divide the voltage equally in any conventional manner known in the art.

Fourth, the interrupters assume only a circuit breaking function, no other. In circuit closed position, they are bypassed or shunted and relieved of electrical stress by the shunt switches; during opening, they are in the circuit only momentarily to make the break; in switch open position, they are totally isolated from and relieved of the electrical stress of the circuit; and during closing, the circuit is remade by the shunt contacts to relieve the interrupters of circuit closing stresses. Thus, the interrupter contacts, like the football place-kicker, are kept on the sidelines except for the moment of performance of their sole specialty.

In regard to the fourth point, it is further noted that vacuum interrupters, thus far, employ butt-type contacts and cannot be built bounce-free. Vacuum is such an efficient interrupting medium that it is possible to produce multiple interruptions during the contact bounce on closing. Vacuum contacts thus may erode more rapidly on closing, than on interrupting. It is for this reason also that the electrical closing duty is removed from the vacuum interrupters and placed on the shunt switches.

Fifth, both the interrupters and the shunt switches will usually be supplemented by and their load breaking capabilities enhanced by supplemental insulation. Specifically, the T component 30 of each switch is so constructed that at least the horizontal leg thereof constitutes a sealed housing which can be filled with insulating material. In some installations, it may prove feasible to employ solid dielectrics such as foam and the like, and even to fill the housing with filtered or uncontaminated air. Generally, however, and especially where the shunt switches are mounted in the housing, I prefer to employ high dielectric liquid and gaseous mediums, such as sulphur hexafluoride at two to three atmospheres pressure, Freon and other like materials.

The presence of this supplemental insulation totally filling their housings substantially reduces the open gap requirements of the shunt switches to facilitate the use of very small switches for high voltages. By virtue of immersion in a high dielectric medium, the shunt contacts can have a short stroke of movement at high speed. They can therefore do a better job of making the circuit than can the interrupter contacts, as above described, with minimum disturbance to the system and minimum contact erosion.

In addition, and of particular import, the immersion of the vacuum interrupters in the high dielectric medium substantially increases the external resistance and flash-over level of the interrupters, whereby the same may be utilized to the full level of their internal capabilities which traditionally and inherently exceed their external capabilities.

Further, to enhance their capabilities and their reliability, the interrupters are mounted in back-to-back relation as shown in FIG. 5 to obviate problems consequent upon polarity sensitivity. Also, to insure equal voltage division over the several interrupters, a voltage dividing network is provided.

Finally, I utilize the interrupters at levels far exceeding their purported capabilities, and I am able to do so with complete safety and reliability because of the foregoing factors; i.e., maintaining the interrupters in electrically unstressed condition to maintain their peak internal capabilities, supplementing their external capabilities to bring them to an increased level approaching their peak internal capabilities, exposing them to the electrical stress of a circuit break in the short duration of a few cycles, and dividing or spreading the circuit breaking stress over a plurality of vacuum gaps.

Figure 12:
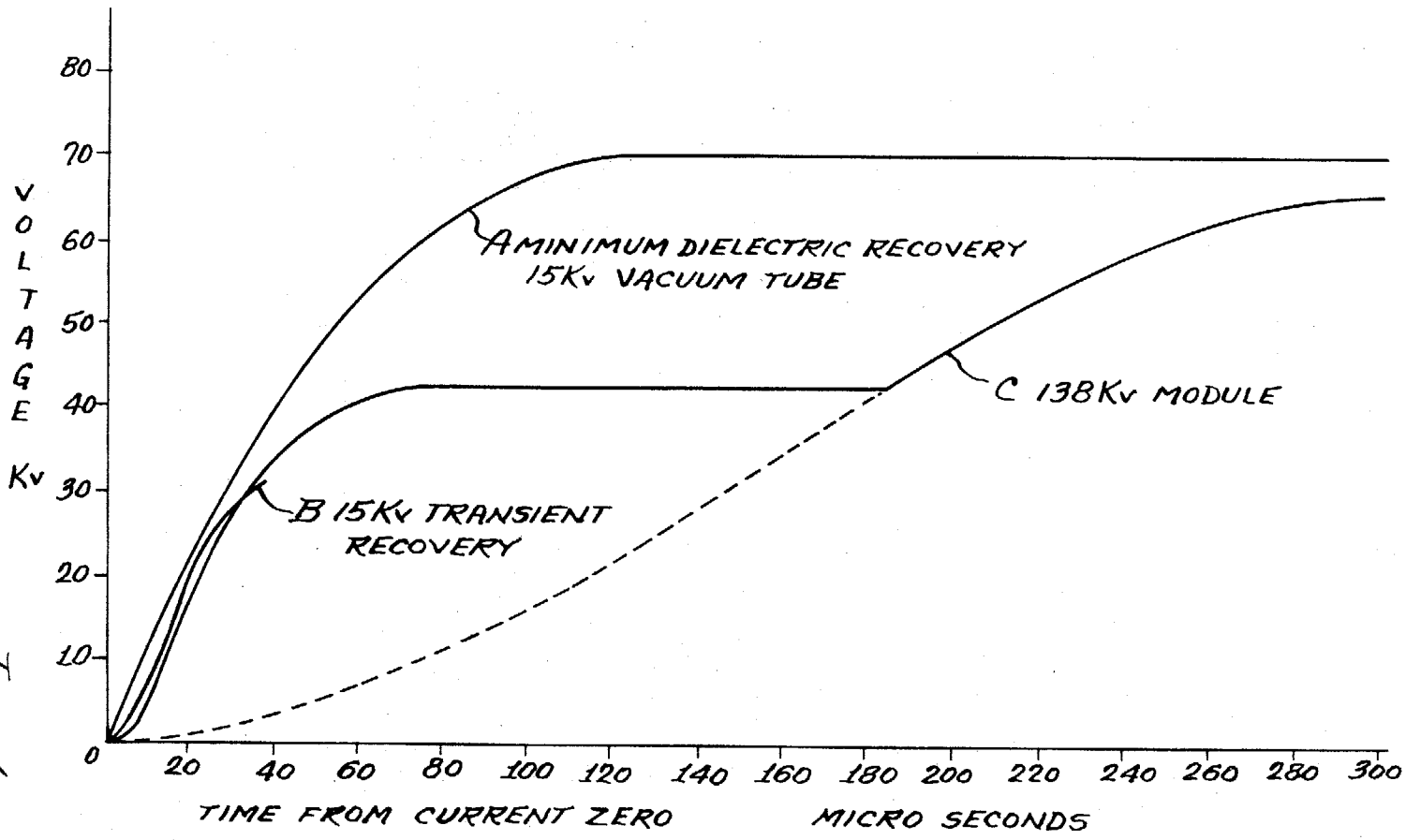
FIG. 12 is a graphic illustration of the mode in which 'interrupters" are adapted to performance of "circuit ›reaking" functions pursuant to this invention.

Referring to FIG. 12, and taking a 15 kv. vacuum tube interrupter switch as an example, the present invention provides for development, interpretation and gainful employment of the curve A, which is a composite of the withstand values inherent in the tube. Specifically it is a composite of (1) the dielectric recovery of the vacuum gap following an interruption—the slope of the curve, which must fundamentally exceed the system transient recovery characteristic plotted at B, and (2) the maximum voltage one minute 60 cycle withstand capability of the switch—the peak value of the curve.

In obtaining the peak value of curve A, I observe that a vacuum tube interrupter rated at 15 kv. continuous service is required to have a 50 kv., one minute, 60 cycle, RMS voltage withstand capability. This RMS or effective value means that the maximum voltage withstand is at least 70.7 kv., i.e., 50 times the square root of 2. Therefore, the interrupter must provide a basic 70.7 kv. transient recovery reference, indicated by the horizontal part of curve A, upon which I am able to rely because of the above explained characteristics of my switch.

As for the slope of curve A, I observe that following an arcing event, the dielectric strength of the vacuum gap starts at a value of the arc voltage at the instant of current zero and grows to a peak value. The rate at which the dielectric strength grows depends on the magnitude, the character and the distribution of the energy at the instant of current zero and its rate of decay from the vacuum gap system following the current zero. Every vacuum tube switch is designed to transport a certain maximum magnitude of energy across the vacuum gap during an arcing event (maximum current) and to cause a decay of the residual energy at least at a defined minimum rate to assure that the current will not resume as the system applies a transient recovery voltage across the vacuum gap.

In the example of FIG. 12, the 15 kv. module is designed to withstand a transient voltage having its first peak of 29.2 kv. at 32.7 micro-seconds, curve B. Therefore, the minimum dielectric recovery strength of this module must be greater than curve B from the time of current zero to 32.7 micro-seconds following current zero.

The ultimate dielectric strength of the vacuum gap and all parts in parallel with the vacuum gap of the switch must be equal, at least, to 70.7 kv.—the one minute withstand value.

There are no defined mechanisms that cause an abrupt change in the initial rate of dielectric recovery for gaps of the dimensions of the average vacuum tube of this module's rating.

Therefore with a defined ultimate value (70.7 kv.) and a defined initial rate (greater than 29.2 kv. in 32.7 microseconds) an exponential curve can be drawn and defined as the minimum dielectric recovery curve for the particular vacuum switch—curve A.

To apply a vacuum tube as a module of a high voltage system, the transient recovery characteristic of the system is divided by the number of modules to be employed. If the divided system transient is at all times less than the dielectric recovery ability of the individual module and the system voltage is uniformly divided across the modules, then this combination of modules is capable of [interrupting] *stopping* the *flow of* current of the high voltage system.

The transient recovery voltage is super-imposed on the 60 cycle system recovery voltage. Therefore, each module must be capable of withstanding its portion of the continuous 60 cycle system voltage for the time between circuit interruption and isolation of the interrupter from the system. This is a time duration of cycles to tens of cycles and therefore may be equal to or less than the 60 cycle one minute withstand value of the module.

Applying these concepts to the design of a circuit breaker for 138 kv., we find that for load and fault switching the maximum phase voltage is equal to 145 kv. (the phase to phase potential) divided by the square root of three (the standard constant) or 83.6 kv. RMS. This value divided by the individual module's one minute RMS withstand of 50 kv. yields 1.67, whereby two 15 kv. vacuum tube modules would satisfy the normal 60 cycle voltage stress of the system.

However, the maximum 60 cycle stress of a breaker in line position occurs when that breaker switches an open-ended line, such stress being 2.4 times the normal stress or 200 kv. RMS in a 138 kv. system. To withstand this stress (200 divided by 50) requires four of the modules.

Dividing the standard values of system recovery voltage transients by the number of modules thus tentatively selected and plotting the results, curve C of FIG. 12, reveals that the transient stresses are at all times no greater than the minimum dielectric recovery strength of the individual module, curve A.

Therefore, four 15 kv. vacuum tube modules fully satisfy the most severe 60 cycle voltage stress and the complete transient recovery stress of 138 kv. system when applied according to this disclosure.

If a 138 kv. circuit [breaker] *switcher* (*combination disconnect and interrupter*) were built using 15 kv. modules without considering the teachings of this disclosure, it would require 10 modules, or 2½ times the number provided by this invention.

Thus, in contrast to the prior art, the present invention can contemplate a practical 138 kv. 1600 Amp Isolating Circuit Breaker having the following characteristics:

BREAKER RATING 138 kv. Nominal Voltage
145 kv. Voltage
335 kv. 60 cycle 1 min. withstand dry
275 kv. 60 cycle 10 sec. withstand wet
650 kv. BIL 1½×40 wave
1600 amps continuous
70 ka. momentary (10 cycle)
40 ka. short time (3 secs.)
12 ka. fault switching
0 to 160 amps magnetizing current
70 amps capacitor current
70 ka. making current Interrupting time—milliseconds
Isolating time—second Closing time—second(s)
Reclosure without isolation—milliseconds
Reclosure with isolation—second(s)

The switch would embody four 15 kv. vacuum tube interrupters immersed in a high dielectric medium. The vacuum tubes would be shunted by four shunt switches as shown in FIG. 5. These switches would be immersed in the same high dielectric medium as the interrupters and assume the high momentary and short time current carrying duty of the switch, as well as being the principal carrier of the continuous current and the circuit reclosing means.

The interrupter portion of the device would be housed as shown in the drawings and mounted on the rotatable stack 31. The isolating function is accomplished by rotating the stack to provide a visibly open switch dimensioned to withstand all voltage stress of the system. The disconnect contacts will interrupt any residual current of voltage distribution resistor-capacitor networks.

The operating mechanism of the switch provides the opening and closing operations previously described, and can be sequenced to open only the shunt *or main* contacts and the vacuum switch contacts for reclosure service. The isolating portion of the switch will be operated when faults are not cleared by single reclosure and/or where isolation is required or desired. The operating mechanism should preferably drive all contacts to closed position and in doing so should preferably load an energy storage device for high speed opening of the shunt and vacuum contacts. Only the disconnect would be opened by the operating mechanism per se.

In the light of the foregoing, the present invention visualizes a family of Isolating Circuit Breakers applicable to practically all commonly used transmission and distribution voltages.

Effective circuit breaker operation, especially at the higher levels, is predicated upon immersion of currently available vacuum tubes in a high dielectric medium, bypassing the tubes with adequately rated shunt *or main contact* means in the closed circuit position, and isolation of the tubes from the system in open circuit position. At the lower voltages, the shunt may be external of the tube housing, but at high voltages the shunt is preferably within the housing and immersed in the dielectric.

In this way the objects and advantages of the invention are attained in a convenient, economical, practical, and safe and reliable manner.

While I have shown and described what I regard to be the preferred embodiment of my invention, it will be appreciated that changes, rearrangements, variations and modifications may be made therein without departing from the scope of the invention, as defined by the appended claims.

I claim:

1. A circuit breaker *for breaking a circuit operating at a given continuous voltage and having a known maximum voltage stress* comprising, in combination, interrupter switch means for breaking the circuit *having a given continuous service voltage rating less than the continuous voltage of the circuit and transient voltage capabilities at least equal to the maximum voltage stress of the circuit,* and means for [isolating] *relieving* said interrupter switch means from circuit stress except at the moment of circuit breaking operation of said interrupter switch means, so that the interrupter switch means [can perform circuit breaking operations] *operates* at the level of the transient capabilities thereof rather than the continuous service ratings thereof *to perform circuit breaking operations.*

2. A circuit breaker as set forth in claim 1, *said stress relieving means* including by-pass switch means in parallel circuit with said interrupter switch means of a current carrying capacity to maintain said interrupter switch means essentially in electrically unstressed condition in the closed circuit position, disconnect switch means for completely isolating the entirety of said interrupter switch means from the circuit in the open circuit position, and operating means for first opening said by-pass switch means, second opening said interrupter switch means and then opening said disconnect switch means so that said interrupter switch means is subject to electrical stress substantially solely at the moment of circuit interruption, *and for first closing said disconnect switch means, second closing said by-pass switch means and then closing said interrupter switch means so that said interrupter switch means is not exposed to circuit closing stresses.*

[3. A circuit breaker as set forth in claim 2, wherein said operating means includes means for first closing said disconnect switch means, second closing said by-pass switch means and then closing said interrupter switch means so that said interrupter switch means is not exposed to circuit closing stresses.]

4. A circuit breaker [for breaking a circuit operating at a given voltage and a given continuous current load] as set forth in claim 1, said interrupter switch means comprising a plurality of interrupters connected in series with one another [and said disconnect switch means], said interrupters each having a standard continuous voltage rating, a one minute RMS voltage withstand rating and a continuous current rating, with the continuous current rating substantially equal to the continuous current load of the circuit; the interrupters being of such number and voltage ratings that the 60 cycle recovery voltage and the transient recovery voltage of each of the interrupters is not substantially greater than approximately its voltage withstand rating but such that the per phase voltage of the circuit divided by the number of interrupters equals a voltage in excess of the continuous voltage rating of each interrupter.

5. A circuit breaker as set forth in claim [4] *1*, said *interrupter switch means comprising a plurality of interrupters connected in series with one another, said* interrupters being mounted electrically in back to back relation with the movable contact of one interrupter juxtaposed to the movable contact of the interrupter next adjacent one end thereof and with the stationary contact of said one interrupter juxtaposed to the stationary contact of the interrupter next adjacent the opposite end thereof, whereby to mitigate polarity sensitivity of said interrupters.

6. A circuit breaker as set forth in claim [4] *5*, including a voltage dividing network in combination with said interrupters.

7. A circuit breaker as set forth in claim [4] *5, said stress relieving means* including by-pass switch means in parallel circuit with said interrupters for maintaining said interrupters electrically unstressed in circuit closed position, disconnect switch means for completely isolating all of said interrupters from the circuit in the open circuit position, and operating means for first opening said by-pass switch means, second opening said interrupters and then opening said disconnect switch means, and for first closing said disconnect switch means, second closing said by-pass switch means and then closing said interrupters.

8. A circuit breaker as set forth in claim 7, said interrupters comprising vacuum tube interrupters, a housing enclosing said vacuum tubes and said by-pass switch means, and a dielectric medium filling said housing and immersing said vacuum tubes and said by-pass switch means.

9. A circuit breaker for breaking a circuit operating at a given *continuous* voltage and a given continuous current load *and having a known maximum voltage stress* comprising, in combination, interrupter switch means *having a continuous current rating substantially equal to the continuous current load of the circuit and having a given continuous service voltage rating less than the continuous voltage of the circuit and transient voltage capabilities at least equal to the maximum voltage stress of the circuit,* means for maintaining said interrupter switch means essentially in electrically unstressed condition in the closed circuit position, disconnect switch means in series circuit with said interrupter switch means for completely isolating the entirety of said interrupter switch means from the circuit in open circuit position, and operating means for first imposing the circuit load on said interrupter switch means, then opening said interrupter switch means and thereafter opening said disconnect switch means [so that] *for completely removing* the entirety of said interrupter switch means [is completely removed] from the circuit immediately following circuit breaking operation, [whereby] *so that* said interrupter switch means [can be of a continuous voltage rating less than the continuous voltage of the circuit and can perform circuit breaking functions] *operates* at the level of the transient capabilities thereof *rather than the continuous service ratings thereof to perform circuit breaking operations.*

10. A circuit breaker as set forth in claim 9, including a housing enclosing said interrupter switch means, and a high dielectric medium filling said housing and immersing said interrupter switch means, said housing comprising essentially an insulated member having contacts at its ends connected in series circuit with said interrupter switch means, said housing being movable and comprising said disconnect switch means.

11. A circuit breaker for breaking a circuit operating at a given continuous voltage and a given continuous current load *and having a known maximum voltage stress* comprising, in combination, vacuum tube interrupter switch means *having a continuous current rating substantially equal to the continuous current load of the circuit and having a continuous service voltage rating less than the continuous voltage of the circuit and transient voltage capabilities at least equal to the maximum voltage stress of the circuit,* by-pass switch means in parallel circuit with said interrupter switch means of a current carrying capacity to maintain said interrupter switch means essentially in electrically unstressed condition in the closed circuit position, disconnect switch means in series circuit with said interrupter and by-pass switch means for completely isolating the entirety of said interrupter switch means from the circuit in open circuit position to maintain the entirety of said interrupter switch means in electrically unstressed condition in the open circuit position, and operating means for first opening said by-pass switch means, second opening said interrupter switch means and then opening said disconnect switch means, and for first closing said disconnect switch means, second closing said by-pass switch means and then closing said interrupter switch means so as to relieve the latter of circuit closing stresses, whereby said interrupter switch means [can] performs circuit breaking operations at the level of the transient capabilities thereof rather than the continuous service ratings thereof.

12. A circuit breaker as set forth in claim 11, including a housing enclosing both said interrupter switch means and said by-pass switch means and an insulating medium filling said housing and immersing both of said switch means.

13. A circuit breaker as set forth in claim 12, said disconnect switch means comprising a pair of stationary disconnect switch contacts mounted adjacent the opposite ends of said housing and a pair of contacts on the ends of said housing, said housing comprising essentially an insulated member having its contacts connected in series circuit with said interrupter switch means and said by-pass switch means, said housing being movable to move its contacts into and out of engagement with said stationary contacts whereby said housing comprises disconnect switch means of the double break type.

14. A circuit breaker comprising a spaced pair of stationary contacts, [an insulating] *a* housing normally extending between said pair of stationary contacts and having contacts at its ends for engagement with said stationary contacts, *said housing comprising a plurality of interconnected insulating segments, an* interrupter switch [means] mounted in its entirety in *each* said housing *segment* and *each* having separable contacts, *the*

*interrupter switches in adjacent segments being mounted in alternate directions so that the movable contact of each interrupter switch is juxtaposed to the movable contact of a next adjacent interrupter switch, said contacts of said interrupter switches being* connected in series circuit with *one another and* the contacts at the ends of said housing, and operating means for first opening said interrupter switches [means] to break the circuit and then moving said housing and its contacts away from said stationary contacts to completely isolate the entirety of said interrupter switches [means] from said stationary contacts, [whereby to adapt said interrupter switch means to circuit breaking operations at the transient capabilities thereof rather than the continuous service rating thereof] *said operating means including means interposed between the adjacent ends of each pair of housing segments at which the movable contacts of the interrupters are juxtaposed for simultaneously opening each juxtaposed pair of movable interrupter contacts.*

15. A circuit breaker as set forth in claim 14, including shunt switch means in parallel circuit with said interrupter switch means and series circuit with said housing contacts of a current carrying capacity adequate to maintain said interrupter switch means in electrically unstressed condition in the closed circuit position, said operating means upon switch opening movement first opening said shunt switch means, second opening said interrupter switch means to break the circuit and then moving said housing to isolate said interrupter switch means from the circuit and maintain the same in electrically unstressed condition in the open circuit position, said operating means upon switch closing movement first moving said housing to engage its contacts with said stationary contacts, second closing said shunt switch means to close the circuit, and then closing said interrupter switch means to relieve the latter of circuit closing stresses.

16. A circuit breaker as set forth in claim 15, said shunt switch means being mounted in said housing, said housing being filled with a high dielectric medium in which said interrupter switch means and said shunt switch means are immersed.

17. A circuit breager [as set forth in claim 14, including] *comprising a spaced pair of stationary contacts, an insulating housing normally extending between said pair of stationary contacts and having contacts at its ends for engagement with said stationary contacts, interrupter switch means mounted in its entirety in said housing and having separable contacts connected in series circuit with the contacts at the ends of said housing, operating means for first opening said interrupter switch means to break the circuit and then moving said housing and its contacts away from said stationary contacts to completely isolate the entirety of said interrupter switch means from said stationary contacts,* a stationary frame mounting said stationary contacts, *and* a movable frame mounted on and guided by said stationary frame, said housing being mounted on said movable frame, said operating means including means operable subsequent to switch opening movement of said housing for moving said movable frame to remove said housing physically from the environment of said stationary contacts to accommodate safe servicing of said housing and said interrupter switch means.

18. A circuit breaker as set forth in claim 17, said housing comprising a T-shaped component having a horizontal leg containing said interrupter switch means and a vertical leg rotatably mounted on said movable frame, said movable frame being vertically reciprocable on said stationary frame, said operating means rotating said component into and out of engagement with said stationary contacts and vertically reciprocating said movable frame when said component is out of engagement with said stationary contacts to move said component into and out of the environment of said stationary contacts.

19. A circuit breaker comprising a pair of spaced stationary contacts, a housing normally extending between said stationary contacts and having contacts at its ends normally engaging said stationary contacts, said housing [in essence being insulating between its said contacts, a plurality of] *comprising a plurality of interconnected insulating housing segments, an* interrupter switch[es] mounted in [their entirety in] *each* said housing [and] *segment, said interrupter switches being* connected in series circuit with one another and said housing contacts to establish an electrical circuit between said stationary contacts, *the interrupter switches in adjacent housing segments being mounted in alternate directions so that the movable contact of each interrupter switch is juxtaposed to the movable contact of a next adjacent interrupter switch, operating means between the adjacent ends of each pair of housing segments at which the movable contacts of a pair of interrupter switches are juxtaposed including* spring biased snap action operating means [in said housing] for simultaneously opening [all of] said interrupter switches, and an operating mechanism connected to said housing and said operating means operable upon switch opening movement for initially effecting operation of said operating means to open said interrupter switches at high speed to break said circuit and for subsequently moving said housing and its contacts away from said stationary contacts to isolate said housing and the entirety of said interrupter switches from said stationary contacts, said operating mechanism being operable upon switch closing movement for first moving said housing and its contacts back into engagement with said stationary contacts and subsequently effecting operation of said operating means to close said interrupter switches.

20. A circuit breaker as set forth in claim 19, including shunt switch means in parallel cricuit with said interrupter switches and series circuit with said housing contacts, said operating mechanism including means for opening said shunt switch means prior to opening of said interrupter switches and for closing said shunt switch means subsequent to movement of said housing back into engagement with said stationary contacts but prior to reclosing of said interrupter switches.

21. A circuit breaker as set forth in claim 20, said operating mechanism including means for opening and closing said shunt switch means and said interrupter switches independently of movement of said housing for circuit breaker reclosure service.

22. A circuit breaker as set forth in claim 19, including *a* shunt switch[es] in *each of* said housing *segments* [of the same number as said interrupter switches], said shunt switches *also* being *mounted in alternate directions and* connected in series circuit with one another and said housing contacts and in parallel circuit with said interrupter switches; said operating means including first drive means connected to [said] *the respective pair of* shunt switches for operating the same simultaneously and second drive means connected to [said] *the respective pair of* interrupter switches for operating the latter simultaneously, said second drive means having a lost motion connection with said first drive means in both the switch opening and the switch closing directions whereby said shunt switches are opened prior to the opening of said interrupter switches and are closed prior to the closing of said interrupter switches; said second drive means including biasing means for effecting high speed opening of said interrupter switches.

23. A process of breaking a high voltage, high current electrical circuit by interrupter means and disconnect means, comprising the steps of inserting in series in each phase of the circuit a plurality of interrupters *having transient voltage capabilities the composite of which is approximately equal to and at least as great as the maximum voltage stress of the phase;* inserting a pair of disconnect means in series in the circuit to opposite sides of said interrupters; *maintaining said interrupters essentially in electrically unstressed condition when the circuit*

*is closed; imposing the full circuit load on the interrupters when it is desired to break the circuit and thereupon* substantially simultaneously operating all of said interrupters to open circuit position; and *substantially immediately* thereafter completely isolating the entirety of said interrupters from the circuit by operating said disconnect means to open circuit position; whereby said interrupters [may be] *are* operated at the level of their transient capabilities rather than their continuous voltage ratings *to perform circuit breaking operations.*

24. A process as set forth in claim 23, including the step of enhancing the capacity of said interrupters by immersing the same in a high dielectric medium.

25. A process as set forth in claim 23, including the steps of normally shunting said interrupters with conductors having adequate current carrying capacity to maintain said interrupters in electrically unstressed condition *when the circuit is closed,* and opening said shunt conductors immediately prior to opening said interrupters *to impose the full circuit load on said interrupters.*

26. A process as set forth in claim 25, including the step of closing the circuit by first closing said disconnect means, second closing said shunt conductors and finally closing said interrupters.

27. A circuit breaker comprising, in combination, interrupter switches for breaking the circuit and means for [completely isolating] *relieving* the entirety of said interrupter switches from voltage stress except at substantially the moment of circuit breaking operation of said interrupter switches, [so that] *said means completely isolating* the entirety of the interrupter switches [have no] *from the circuit and thus from* electrical stress [thereon] in the open circuit position [and can perform], *said interrupter switches having composite transient voltage capabilities at least as great as and approximately equal to the maximum voltage stress of the circuit for performing* circuit breaking operations at the level of the transient capabilities thereof rather than the continuous service ratings thereof.

28. A circuit breaker as set forth in claim 27, wherein said [isolating] *stress relieving* means [comprises] *includes* disconnect switches in series with said interrupter switches to opposite sides thereof for completely isolating the entirety of said interrupter switches from the circuit in the open circuit position.

*29. A process of breaking a high voltage, high current electrical circuit by interrupter means, comprising the steps of inserting in series in the circuit interrupter means having a given continuous service voltage rating the composite of which is less than the continuous voltage of the circuit and having transient voltage capabilities the composite of which is at least equal to the maximum voltage stress of the circuit, relieving said interrupter means from circuit stress except at the moment when the circuit is to be broken, imposing the full circuit load on said interrupter means only when it is desired to break the circuit and thereupon substantially simultaneously operating said interrupter means to open circuit position and immediately thereafter completely isolating the entirety of said interrupter means from the circuit, so that said interrupter means are operated at the level of the transient voltage capabilities thereof rather than the continuous voltage rating thereof to perform circuit breaking operations.*

*30. A process as set forth in claim 29, including the steps of maintaining the interrupter means in unstressed condition when the circuit is closed by normally shunting said interrupter means with conductors having adequate current carrying capacity to maintain said interrupter means electrically unstressed, and isolating the interrupter means from the circuit when in open circuit position by opening a pair of disconnect means connected in series circuit with said interrupter means to opposite sides thereof.*

*31. A process as set forth in claim 30, including the step of closing the circuit by first closing said disconnect means, second closing said shunt conductors and finally closing said interrupter means.*

References Cited

The following references, cited by the Examiner, are of record in the patented file of this patent or the original patent.

UNITED STATES PATENTS

| | | | |
|---|---|---|---|
| 2,710,322 | 6/1955 | Price | 200—145 X |
| 2,838,637 | 6/1958 | Schwager | 200—144 B |
| 2,872,550 | 2/1959 | Schwager | 200—48 R |
| 3,154,656 | 10/1964 | Gussow et al. | 200—146 R |
| 3,268,696 | 8/1966 | Lindell | 200—144 B |

FOREIGN PATENTS

| | | | |
|---|---|---|---|
| 1,028,719 | 5/1966 | Great Britain | 200—48 SB |
| 1,128,506 | 4/1962 | Germany | 200—48 R |

HERMAN J. HOHAUSER, Primary Examiner

U.S. Cl. X.R.

200—145, 148 D